(12) United States Patent
Noebel et al.

(10) Patent No.: US 11,987,365 B2
(45) Date of Patent: May 21, 2024

(54) DEVICE FOR ATTACHING AN OBJECT TO AN ATTACHMENT RAIL, ARRANGEMENT FOR ATTACHING AN OBJECT, METHOD, AND SEAT RAIL

(71) Applicant: Airbus Operations GmbH, Hamburg (DE)

(72) Inventors: Torsten Noebel, Hamburg (DE); Andreas Dresel, Hamburg (DE); Mathieu Bonnet, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/749,013

(22) Filed: May 19, 2022

(65) Prior Publication Data

US 2022/0380017 A1    Dec. 1, 2022

(30) Foreign Application Priority Data

May 31, 2021   (EP) ..................... 21176919

(51) Int. Cl.
*B64D 11/06* (2006.01)
*B64C 1/20* (2006.01)

(52) U.S. Cl.
CPC ............ *B64D 11/0696* (2013.01); *B64C 1/20* (2013.01)

(58) Field of Classification Search
CPC .... B64C 1/18; B64D 11/0696; B64N 2/01566
See application file for complete search history.

(56) References Cited

U.S. PATENT DOCUMENTS

| 3,241,501 | A | 3/1966 | Welton | |
| 2005/0173608 | A1 | 8/2005 | Lory | |
| 2007/0232101 | A1* | 10/2007 | Hudson | B64D 11/0696 439/157 |
| 2019/0315473 | A1* | 10/2019 | Mochizuki | B64D 11/0648 |
| 2020/0148365 | A1 | 5/2020 | Simpson | |

OTHER PUBLICATIONS

European Search Report for Application No. 21176919 dated Nov. 17, 2021.

* cited by examiner

*Primary Examiner* — Brady W Frazier
*Assistant Examiner* — Shanna Danielle Glover
(74) *Attorney, Agent, or Firm* — KDW Firm PLLC

(57) ABSTRACT

A device for attaching an object to an attachment rail, particularly a seat rail, in an aircraft or spacecraft. A base part has a support surface to be placed onto an outer surface of the rail, and a locking element to partially protrude from the support surface along a line of protrusion. The base part and locking element are coupled or configured to be coupled wherein the locking element can be moved relative to the base part along the line of protrusion and rotated with respect to the base part. An end section of the locking element has a tip portion shaped in a dovetail-type manner. The device includes a tensioning arrangement for tensioning the locking element with respect to the rail. An arrangement includes such a device as well as an attachment rail with a rail main body and a plurality of bushes. A method for attaching an object, and a seat rail are disclosed.

14 Claims, 6 Drawing Sheets

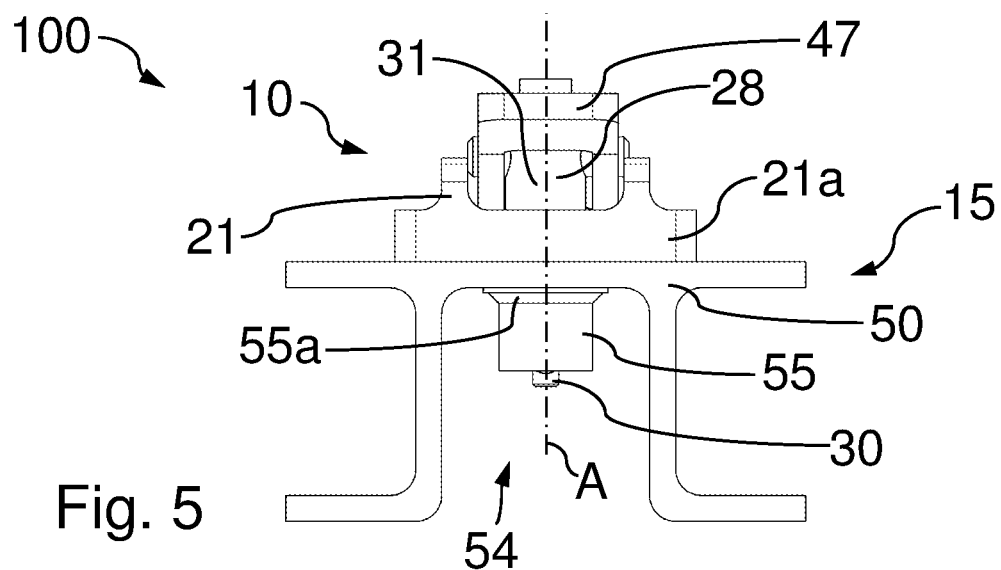
Fig. 5
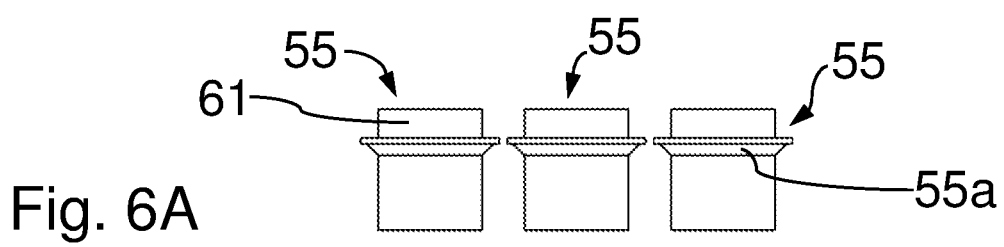
Fig. 6A
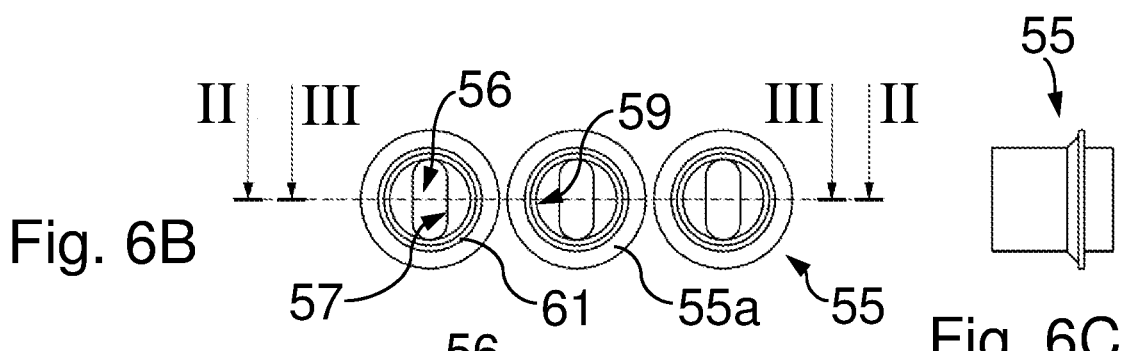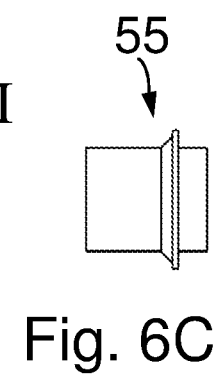
Fig. 6B
Fig. 6C
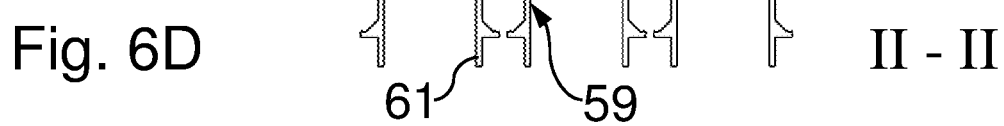
Fig. 6D
II - II
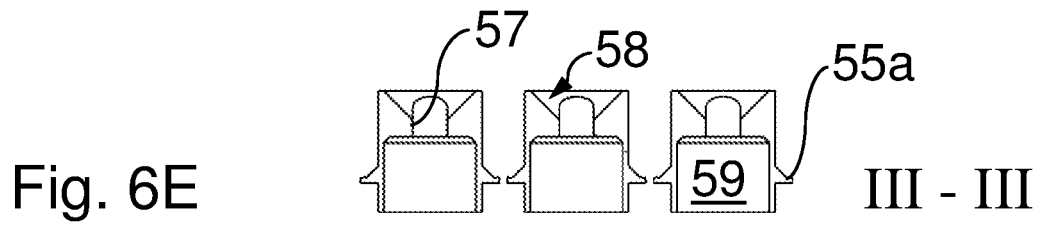
Fig. 6E
III - III

DEVICE FOR ATTACHING AN OBJECT TO AN ATTACHMENT RAIL, ARRANGEMENT FOR ATTACHING AN OBJECT, METHOD, AND SEAT RAIL

CROSS-REFERENCE TO RELATED APPLICATION

This application claims priority to European Patent Application No. 21176919.5 filed May 31, 2021, the entire disclosure of which is incorporated by reference herein.

TECHNICAL FIELD

The disclosure herein relates to a device for attaching an object to an attachment rail, in particular to a seat rail in an aircraft or spacecraft. Moreover, the disclosure herein relates to an arrangement and to a method for attaching an object within an aircraft or spacecraft. Still further, the disclosure herein relates to a seat rail, in particular for an aircraft or spacecraft.

BACKGROUND

Although the disclosure herein may be useful for attaching objects of various kinds in many fields of application, the disclosure herein and the underlying problem will be explained in the following in greater detail with regard to a seat rail for use in the passenger cabin of an aircraft, as an example of an attachment rail.

It is generally known to attach passenger seats in aircraft to seat rails arranged in the region of a cabin floor.

An example conventional seat rail design is based on a profile rail having an overall I-shape and comprising, on its upper side turned towards the cabin, a protruding portion including an undercut groove extending along the length of the rail, wherein the entrance of the groove is enlarged at regular intervals by apertures of, for instance, circular shape. The apertures may, in a conventional example, be regularly spaced from each other by 1 inch. Seats are fixed to such rails using specific inserts.

A seat rail having an undercut groove and apertures of such type is, for example, shown in DE 42 24 821 A1.

It has been perceived that such conventional seat rails, made from an aluminum alloy, may be subject to corrosion, especially in areas where spilled liquids are likely to come into contact with the seat rails and adjacent floor elements from time to time. This particularly applies to areas where a galley or lavatory is arranged. Corrosion of this type may be promoted by surfacial scratches, which may occur when inserts are moved relative to the rails, e.g. during mounting of the seats.

Therefore, seat rails made from titanium alloys, which have a significantly higher resistance to corrosion, have been proposed. However, such seat rails are much more expensive than conventional aluminum rails and undesirably increase overall cost.

A seat rail comprising an upper section made from a titanium alloy and connected to a lower section made from an aluminum alloy has been proposed in EP 1 544 105 A1 and US 2005/0156095 A1.

Moreover, a seat track having multiple spaced openings, and a fitting for connection to such an aircraft seat track, are described in US 2010/0038483 A1.

Further, apparatus and methods for coupling a payload to a support track are described in U.S. Pat. No. 7,370,832 B2, U.S. Pat. No. 7,413,143 B2 and U.S. Pat. No. 7,607,613 B2, for example.

Also, conventionally, when using many hitherto existing types of fittings, an assembly operator or technician has to spend significant time for connecting an object to a seat rail in an aircraft. In view of the large number of, for example, seats in a commercial aircraft, this further contributes to an increase in cost.

Against this background, it would be desirable to be able to attach objects, such as e.g. seats, monuments or other devices, in a further improved, cost-saving manner. In particular, it would be desirable to at least reduce the effort and cost hitherto required to prevent or delay corrosion of attachment rails and/or to make it possible to attach the objects in a more rapid and effort-saving way.

SUMMARY

In view of this, a problem to be solved by the disclosure herein is to provide an improved device for attaching an object to an attachment rail, which makes it possible to attach the object in a reliable and rapid manner while also being suitable for use with rails that help to prevent corrosion in a cost-effective manner. A correspondingly improved arrangement and method are to be proposed, too. Also, an attachment rail, in particular a seat rail, is to be provided which makes it possible to avoid corrosion in an expedient and cost-saving manner.

According to the disclosure herein, this problem is solved by a device for attaching an object, by an arrangement for attaching an object, and/or by a method for attaching an object, and/or by a seat rail disclosed herein.

Accordingly, a device for attaching an object to an attachment rail, in particular to a seat rail in an aircraft or spacecraft, is proposed, wherein the device comprises a base part having a support surface adapted to be placed onto an outer surface of the attachment rail, and at least one locking element adapted to partially protrude from the support surface of the base part along a line of protrusion. The base part and the locking element are coupled or configured to be coupled in such a manner that the locking element can be moved relative to the base part along the line of protrusion and can be rotated with respect to the base part. An end section of the locking element has a tip portion shaped in a dovetail-type manner. The device further comprises at least one tensioning arrangement for tensioning the locking element with respect to the attachment rail when the support surface of the base part rests on the outer surface of the attachment rail and the tip portion is in an engaging position relative to the attachment rail.

Furthermore, an arrangement for attaching an object within an aircraft or spacecraft is proposed, which comprises at least one device according to the disclosure herein and at least one attachment rail. The device comprises at least one locking element, wherein an end section of the locking element has a tip portion shaped in a dovetail-type manner. The attachment rail comprises a rail main body and a plurality of bushes, wherein the rail main body has an upper flange provided with a plurality of through-holes arranged along the upper flange according to a predetermined pattern, and wherein the bushes are connected to the upper flange from a lower side thereof. Each bush is arranged at a position corresponding to a position of an associated one of the through-holes, and further, each of the bushes is formed with an internal passage therethrough. The locking element of the device extends into the internal passage of one of the bushes, with the tip portion being engageable with the bush.

Moreover, a method for attaching an object within an aircraft or spacecraft is provided. The method comprises:

providing at least one device according to the disclosure herein, the device comprising at least one locking element, wherein an end section of the locking element has a tip portion shaped in a dovetail-type manner;

providing at least one attachment rail comprising a rail main body and a plurality of bushes, wherein the rail main body has an upper flange provided with a plurality of through-holes arranged along the upper flange according to a predetermined pattern, and wherein the bushes are connected to the upper flange from a lower side thereof, each bush being arranged at a position corresponding to a position of an associated one of the through-holes, and further wherein each of the bushes is formed with an internal passage therethrough;

inserting the locking element of the device into the internal passage of one of the bushes; and engaging the tip portion of the locking element with the bush.

Still further, the disclosure herein provides a seat rail adapted for attaching an object, in particular a seat or a monument, to the seat rail within an aircraft or spacecraft, wherein the seat rail comprises a body formed with a fiber-reinforced synthetic material. In particular, the body of the seat rail may be formed with a fiber-reinforced thermoplastic synthetic material.

An idea underlying the disclosure herein is that using a locking element which may be rotated and which may be moved along the axis of rotation in order to tension the tip portion of the locking element against a counterpart, which is a part of the attachment rail, the device may be easily and rapidly engaged with and locked to the rail. The installation of the seats, or of other objects, may hence be easily performed in a bayonet-type manner within a short time. In particular, the disclosure herein provides an improved way of attaching the object to an attachment rail having a row of spaced apertures.

At the same time, the device makes it possible to quickly and reliably attach the object to the attachment rail also if a significant portion of the rail, for example in the form of a body forming part of the rail, is made from a material different from metal, in particular from a fiber-reinforced synthetic material.

The disclosure herein thus provides for reliable and rapid attachment of an object, for instance a seat or a monument, to an attachment rail which has a geometry that may be suitably manufactured by methods different from metal extrusion. More particularly, the disclosure herein provides for reliable, rapid attachment of the object to an attachment rail, in particular a seat rail, made with a fiber-reinforced plastics material, useful to prevent corrosion of rails in a cost-efficient manner.

Advantageous improvements and developments of the disclosure herein are set forth in the description referring to the drawings.

According to a development, the locking element has a substantially pin-type shape. Such a locking element may be conveniently manufactured.

According to an improvement, the locking element comprises a portion having a substantially cylindrical outer shape and configured to be received in and extend through an opening in the base part. In this manner, the locking element may be configured in an expedient manner to enable linear movement and rotation thereof relative to the base part.

According to an improvement, the end section of the locking element is formed with a shape that is flattened with respect to the portion having the substantially cylindrical outer shape, wherein the end section is laterally contained within an imaginary extension of the lateral surface of the portion having the substantially cylindrical outer shape. In this way, coupling the locking element with the base part can be accomplished in a simple manner.

According to a further development, the locking element is adapted to be partially inserted, with the tip portion ahead, into a passage extending into the attachment rail from the outer surface thereof. Hence, the locking element can be brought into engagement with the attachment rail in a simple and rapid manner.

According to a development, the end section comprises recesses on opposite narrow sides thereof, wherein each of the recesses comprises a retaining surface that obliquely extends with respect to a longitudinal axis of the locking element. This may further contribute to simplifying the production of the locking element, as the recesses may be implemented in the narrow sides of the flattened end section in expedient manner, to produce the dovetail shape.

In particular, the dovetail-type shape is formed symmetric, which contributes to an even load distribution.

In a development, the tensioning arrangement comprises at least one cam that is pivotably coupled with the locking element and/or the tensioning arrangement comprises a lever for applying a tensioning load on the locking element. In particular, the lever may be operable to pivot the cam or cams. The lever and the cam may in particular each be formed as integral portions of a unitary tensioning component including the lever and the cam(s). In this manner, the locking element can be tensioned in a rapid and simple manner, in particular by hand, without the use of special tools. The lever and cam may preferably be configured in such a way that when the cam or cams has/have been brought into a tensioned state, the cam or cams remain(s) in that state unless the lever is operated.

According to an improvement, the base part is additionally formed with a protrusion on the support surface at a position spaced from the position of the locking element. In this improvement, the protrusion may be integrally formed with the base part or may be formed by an additional element fixedly connected thereto. Further, in this improvement, the protrusion is adapted to being inserted into a further passage extending from the outer surface into the attachment rail. In this way, rotation of the device, particularly the base part thereof, with respect to the rail is prevented and loads acting on the device parallel to the outer surface thereof, in particular in an X direction parallel to the longitudinal axis of the attachment rail, can be transmitted to the rail via the protrusion.

According to a development, the base part comprises a plate-shaped section that is provided with the support surface.

In a further development, the base part is provided with a coupling section adapted to being mechanically coupled with the object to be attached.

In further improvements, the device may comprise several locking elements and/or several tensioning arrangements. In particular, the device may comprise two locking elements and two tensioning arrangements. In this way, even higher loads, for example for attaching larger and/or heavier objects, can be transmitted to the rail.

The object to be attached may in particular be a seat, for example a passenger seat, of an aircraft or spacecraft. In a preferred development, the device is formed as a fitting, in particular a rear fitting, for attaching a passenger seat of an aircraft or spacecraft to the attachment rail. Using the device proposed by the disclosure herein, the seat may be rapidly and easily installed, or re-installed, and attached to a seat attachment rail, and in particular to an attachment rail made with a fiber-reinforced synthetic material.

In alternative developments, the object to be attached may, for example, be a monument, in particular a galley monument or a lavatory monument or a storage monument to be arranged in the cabin of the aircraft or spacecraft. In particular, the device may be formed as a fitting for attaching a monument to the attachment rail within the cabin of an aircraft or spacecraft. Accordingly, monuments as well may be attached in an easy and quick manner within the cabin.

In a development, the internal passage of each of the bushes comprises a passage portion formed with an elongated cross-section. The passage portion may, in particular, be centered with respect to a further axial portion of the internal passage. By virtue of the passage portion and the elongated shape thereof, engagement of the tip portion and the bush can be accomplished in a rapid and simple manner, in particular by a rotating or pivoting movement of the locking element, for instance through an angle of less than 180 degrees, preferably approximately 90 degrees.

According to a further development, each of the bushes comprises, on a side of the bush facing away from the upper flange of the rail main body, a contact surface adjacent the passage portion formed with the elongated cross-section, the contact surface of the bush being adapted to contact retaining surfaces of the tip portion of the locking element. In this development, the contact surface of the bush is shaped in such a manner as to create a recess on the side of bush facing away from the upper flange. In particular, the contact surface of the bush may be concave. This development contributes to a surface contact of the tip portion and the bush and helps to prevent stress concentrations. In this manner, significant loads acting on the locking element may be safely and reliably transmitted to the rail.

In a further improvement, the bush comprises, on a side thereof directed toward the upper flange of the attachment rail, a substantially cylindrical cavity at least partially arranged within the through-hole associated with the bush. In particular, an inner dimension, more specifically an inner diameter, of the cylindrical cavity may substantially correspond to an inner dimension, particularly an inner diameter, of the opening in the base part adapted to receive the portion of the locking element having the substantially cylindrical outer shape, or may be slightly larger. In this way, the portion having the substantially cylindrical outer shape may partially be received and guided within the substantially cylindrical cavity, which contributes to stable, reliable operation of the device.

The inner cross-section of both the cylindrical cavity and the opening in the base part may in particular be substantially circular.

In a development, the bush comprises an outer shape that is substantially rotationally symmetric. For example, the bush may be formed with a substantially circular outer contour. Such a bush can be comparatively easily produced.

Further, according to an improvement, the bush comprises an outwardly-extending collar adapted to support the bush against the rail main body. In this way, forces introduced into the bush may be transmitted to the rail main body without inducing exceedingly high stresses at the interface between the bush and the rail main body, thereby reliably preventing damage in particular to the rail main body.

In a preferred development, the rail main body is made from a fiber-reinforced synthetic material, in particular from a carbon-fiber reinforced synthetic material. Preferably, the synthetic material is a thermoplastic material.

In particular, the rail main body comprises a cross-section substantially formed with an omega shape. An omega-shaped design is well suited for manufacturing a composite rail main body from a fiber-reinforced synthetic material, in particular in a continuous manufacturing process.

In an alternative development, the rail main body may be made from a sheet metal material using a folding process.

According to a further improvement, the locking element and/or the base part and/or the cam and the lever each are made from a metal material. In this way, a robust device may be obtained. Furthermore, forming the locking element from a metal material contributes to reliably transmitting loads acting on the locking element to the rail, in particular in cooperation with a bush made from a metal material.

According to a preferred development, the bushes are each made from a metal material, in particular from a titanium material or a steel.

In a further development, the device may be configured to prevent rotation of the locking element and/or operation of the lever when the locking element is tensioned with respect to the attachment rail by the tensioning arrangement. In this way, inadvertent unlocking and disengagement of the device can be avoided.

In a development of the seat rail proposed by the disclosure herein, the body formed with the fiber-reinforced synthetic material is a rail main body, wherein the rail main body has a flange, in particular an upper flange, provided with a plurality of through-holes arranged along the flange according to a predetermined pattern. In accordance with this development, the seat rail further comprises a plurality of bushes which are connected to the flange, wherein each bush is arranged at a position corresponding to a position of an associated one of the through-holes, and further wherein each of the bushes is formed with a passage therethrough. In particular, the bushes are made from a metal material, in particular from a titanium material or a steel.

Further, in particular the above-described developments and improvements relating to the bushes and to the rail main body, formed with the fiber-reinforced synthetic material, may be applied to the seat rail proposed by the disclosure herein.

The improvements, enhancements and developments of the disclosure herein may be arbitrarily combined with each other whenever this makes sense. Moreover, other possible enhancements, developments and implementations of the disclosure herein comprise combinations of features of the disclosure herein which have been described above or will be described in the following in relation to the detailed description of embodiments, even where such a combination has not been expressly mentioned.

In particular, the improvements, enhancements and developments of the disclosure herein described above may be applied in analogous manner to each of the device, arrangement, method and seat rail disclosed herein.

BRIEF DESCRIPTION OF THE DRAWINGS

The disclosure herein will be explained in the following with reference to the schematic figures of the drawings which illustrate embodiments of the disclosure herein. In the drawings:

FIG. 5 displays an end view of the arrangement according to the embodiment of FIGS. 2 to 4;

FIG. 6A displays a side view of three example bushes as used in the arrangement of FIGS. 2 to 5;

FIG. 6B displays a top view of the bushes of FIG. 6A;

FIG. 6C displays another side view of the bushes of FIG. 6A;

FIG. 6D displays a sectional view II-II of the bushes as indicated in FIG. 6B;

FIG. 6E displays another sectional view III-III of the bushes as indicated in FIG. 6B;

Figure 1:
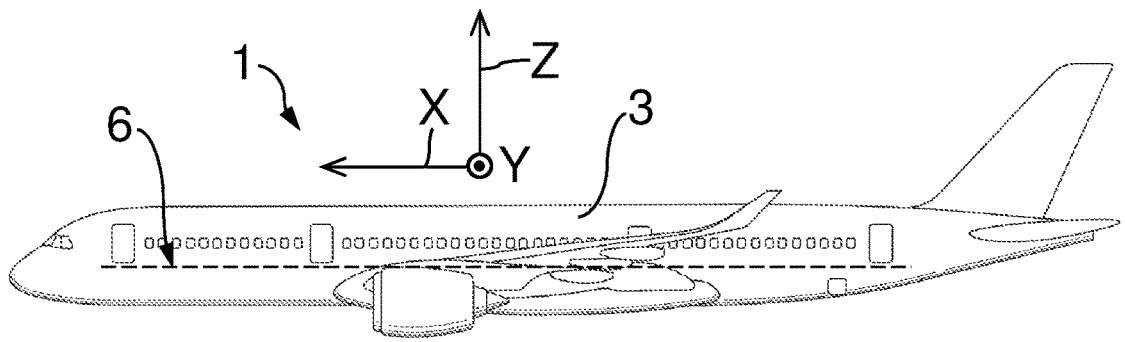
FIG. 1 is an example airplane in side view, in which embodiments of the disclosure herein may be used.

The enclosed drawings are intended to illustrate embodiments of the disclosure herein so that the disclosure herein may be further understood. The drawings, in conjunction with the description, are intended to explain principles and concepts of the disclosure herein. Other embodiments and many of the advantages described may be inferred from the drawings. Elements of the drawings are not necessarily drawn to scale.

Elements, features and components which are identical or which have the same function or effect have been labeled in the drawings using the same reference signs, except where explicitly stated otherwise.

DETAILED DESCRIPTION

FIG. 1 displays a passenger airplane 1 comprising a fuselage 3 as well as wings, stabilizers and engines. Inside the fuselage 3, the airplane 1 comprises a passenger cabin having a cabin floor 6, schematically indicated in FIG. 1.

In order to attach passenger seats to the cabin floor 6 in a reliable and rapid manner, the cabin floor 6 comprises a plurality of seat attachment rails or seat rails 15. In the example airplane 1 of FIG. 1, the seat attachment rails 15 each extend parallel to a longitudinal direction X of the airplane 1 along the cabin floor 6. A direction Z designates a vertical direction, see FIG. 1. Furthermore a transverse direction Y is shown.

An arrangement 100 for attaching an object 91 such as a passenger seat within the aircraft 1 is illustrated in FIGS. 2 to 5 and 11. The arrangement 100 comprises a seat attachment rail 15 as well as a device 10 using which a passenger seat 91 is attached to the seat attachment rail 15. FIGS. 2 to 5 and 11 also illustrate a method and a seat rail 15, which is part of the arrangement 100, according to embodiments of the disclosure herein.

Figure 2:
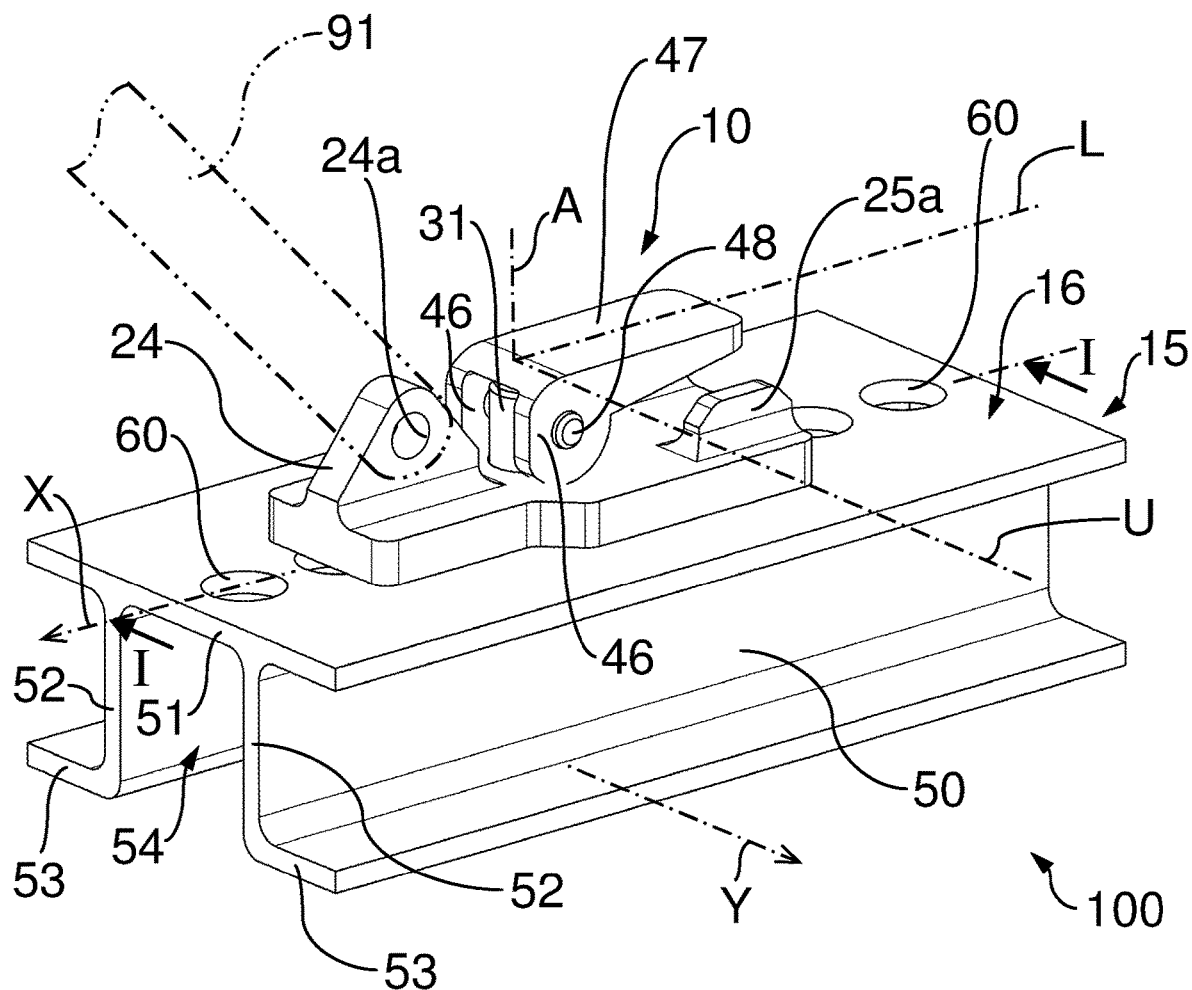
FIG. 2 illustrates a device and arrangement according to an embodiment of the disclosure herein, in a perspective top view.

A short section of the rail 15 is displayed in FIG. 2. The cabin floor 6 as well as any supporting structures of the cabin floor 6, e.g. for supporting the seat rail 15, are omitted in FIGS. 2 to 5 for greater clarity. When installed as part of the cabin floor 6, the seat attachment rail 15 typically will be significantly longer than the section shown in FIG. 2 for illustration.

In FIG. 2, only a portion of a rear leg of the seat 91 is schematically shown. The device 10 is formed, in the example of FIGS. 2 to 5, as a rear fitting for attaching the rear leg of the seat 91. FIGS. 2 to 5 show the device 10 in a locked state thereof, in which the attachment of the rear leg of the seat 91, schematically indicated in FIG. 2, has been accomplished.

Figure 10B:
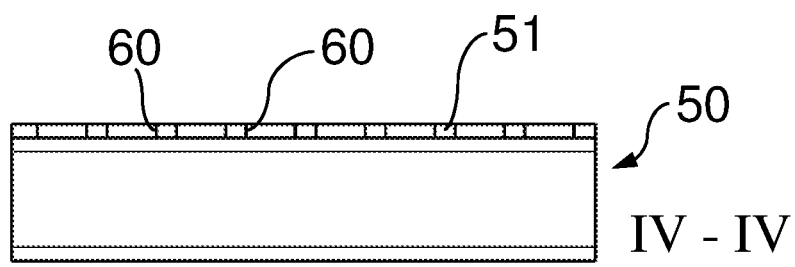
FIG. 10B displays the rail main body of FIG. 10A in a central longitudinal sectional view IV-IV, as indicated in FIG. 10A.
Figure 10A:
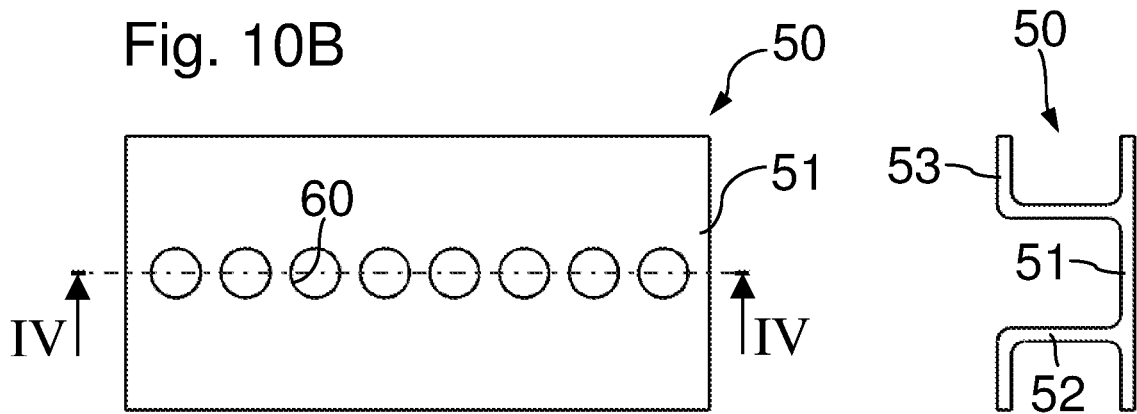
FIG. 10A displays a rail main body of an attachment rail of the arrangement according to the embodiment of FIGS. 2 to 5 in a top view.
Figure 10C:
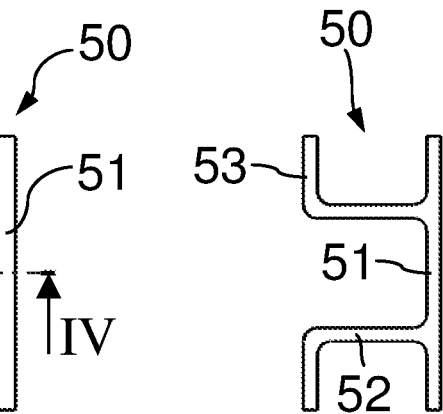
FIG. 10C displays an end view of the rail main body of FIG. 10A.

The seat attachment rail 15 in FIGS. 2 to 5 comprises a rail main body 50 having a cross-section substantially formed with an omega shape. The cross-sectional shape of the rail main body 50 is symmetric and its basic shape is essentially constant along the longitudinal direction of the rail 15, which is shown parallel to the X-direction as defined with respect to the aircraft 1 of FIG. 1. The rail main body 50 is shown again separately in FIGS. 10A-C.

More specifically, see e.g. FIG. 2, the rail main body 50 is provided with an upper flange 51, webs 52 and lower flanges 53. When the rail 15 is installed as part of the cabin floor 6, the upper flange 51 as well as the lower flanges 53 each extend parallel to an X-Y-plane, while the webs 52 each extend parallel to an X-Z-plane. Hence, when the airplane 1 is on the ground, the webs 52 are substantially vertically oriented, while the flanges 51, 53 are substantially horizontal.

When the attachment rail 15 is installed as part of the cabin floor 6, an upper surface of the flange 51 forms an outer, upper surface 16 of the rail 15, wherein the upper surface 16 faces the cabin interior.

The webs 52 extend parallel to each other. First ends of the webs 52 are integrally connected to the upper flange 51, while second ends of the webs 52 are each integrally connected to one of the lower flanges 53. Between the webs 52, as seen from an underside of the rail 15, a channel 54 is formed, which is bounded on the top side of the rail 15 by the upper flange 51. The lower flanges 53 each extend laterally outward from the second, lower ends of the webs 52. The upper flange 51 laterally protrudes beyond the first, upper ends of the webs 52.

FIG. 2 also shows that the rail main body 50 is provided, in the upper flange 51, with a row of through-holes 60, which preferably are each formed with a circular cross-section. In the example of FIG. 2, the through-holes 60 are equidistantly arranged, i.e. spaced at equal distances between adjacent through-holes 60 along the longitudinal direction of the attachment rail 15, which in FIG. 2 corresponds to the X direction. In particular, the through-holes 60 of FIG. 2 are all identically shaped. The through-holes 60 may be formed e.g. by drilling into the upper flange 51.

The rail main body 50 in FIGS. 2 to 5, 10A-C and 11 is produced from a fiber-reinforced synthetic material, preferably from a fiber-reinforced thermoplastic synthetic material. In particular, the rail main body 50 may preferably comprise carbon fibers as reinforcing fibers, embedded into the synthetic, preferably thermoplastic, matrix material. Such a rail main body 50 is comparatively lightweight, can be produced at reasonable cost, and helps to avoid corrosion of the seat rails 15. For example, the rail main body 50 can be produced by producing a semifinished product using a continuous production method and then drilling the through-holes 60.

Part of the cabin floor 6 may be equipped with seat rails 15 of the type displayed in FIGS. 2 to 5 and 11, in particular so-called "wet" areas, where spilling of liquids is to be expected. In particular, however, substantially the entire cabin floor 6 may be provided with seat rails 15 as described with reference to FIGS. 2 to 5 and 11, both in the so-called "wet" areas and in so-called "dry" areas, where spilling of liquids is less likely to occur in the latter. Hence, using the rail 15 of FIGS. 2 to 5 and 11, the process of equipping the cabin floor 6 with seat rails may be significantly facilitated, and the corresponding effort and cost can be reduced.

Figure 3:
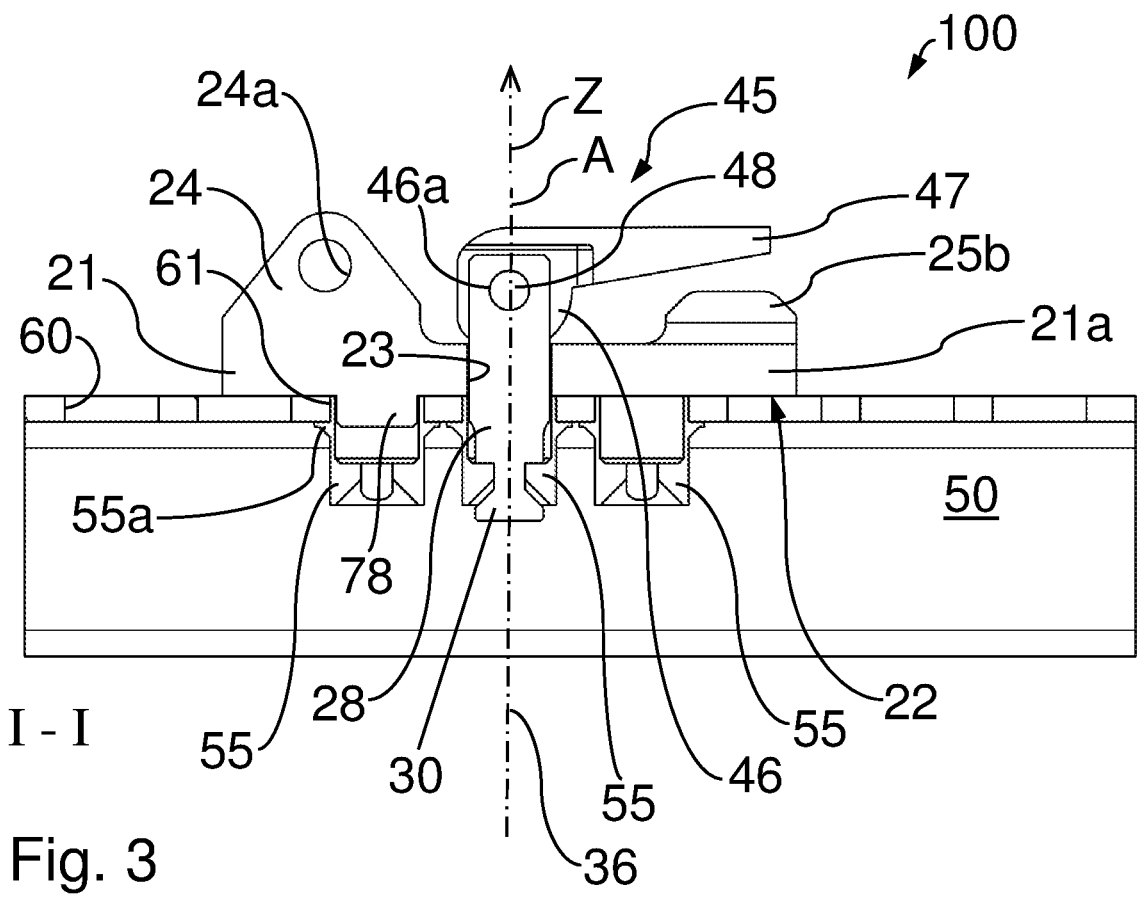
FIG. 3 illustrates the device and arrangement according to the embodiment of FIG. 2, in a central longitudinal sectional view I-I.
Figure 4:
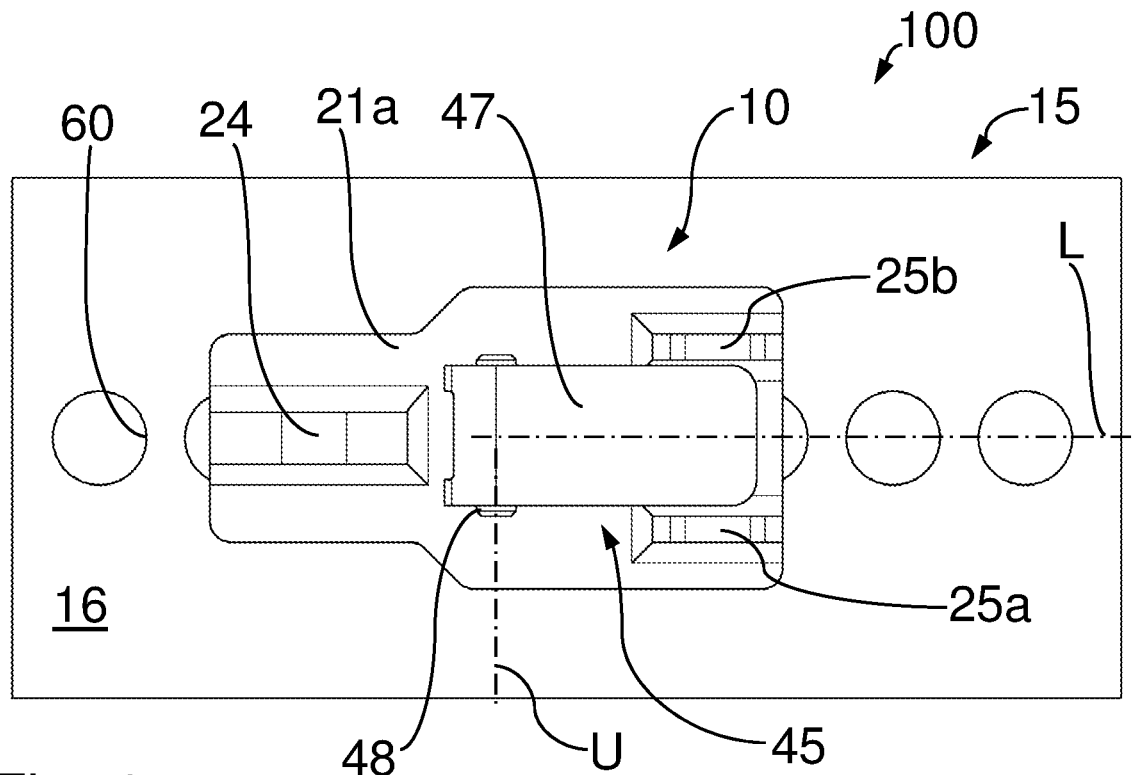
FIG. 4 displays a top view of the arrangement according to the embodiment of FIGS. 2 and 3.

The device 10 shown in FIG. 2 is illustrated again in FIGS. 3 to 5, in a locked state identical to the state of FIG. 2.

Figures 8A, 8B, 8C:
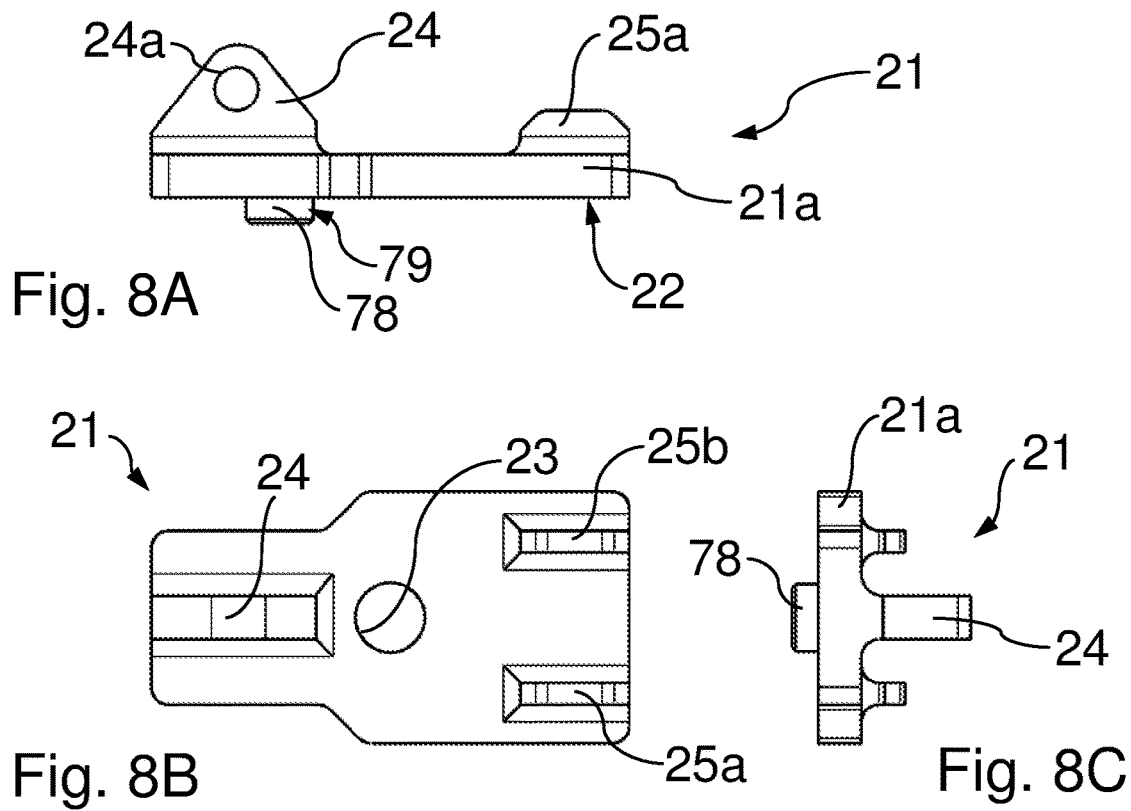
FIG. 8A shows a base part of the device according to the embodiment of FIGS. 2 to 5, in a side view.
FIG. 8B shows the base part of FIG. 8A in a top view.
FIG. 8C shows the base part of FIG. 8A in an end view.

The device 10, or rear fitting, comprises a base part 21, see also FIGS. 8A-8C. The base part 21 includes a plate-shaped section 21a, wherein on a bottom side of the section 21a, an essentially flat support surface 22 of the base part 21 is formed. Furthermore, the plate-shaped section 21a is provided with a circular opening 23, which forms a through-hole from the bottom side to an upper side of the section 21a.

FIGS. 3, 8A and 8C additionally show that the plate-shaped section 21a of the base part 21 is further provided with a protrusion 78 that protrudes from the support surface 22, at a position on the surface 22 spaced from the position of the opening 23.

The protrusion 78 may, for instance, be integrally formed with the plate-shaped section 21a, or the protrusion 78 may be formed by fixedly connecting a protruding element to the plate-shaped section 21a. A lateral outer surface 79 of the protrusion 78 has the shape of a circular cylinder.

The base part 21 is essentially symmetric with respect to a longitudinal center line thereof, which corresponds to the X-direction in the installed state shown in FIG. 2.

On the upper side of the plate-shaped section 21a, opposite the support surface 22 of the base part 21, the base part 21 furthermore comprises three additional protrusions which are shaped in the manner of upright plate-shaped first, second and third sections 24, 25a and 25b extending from the upper side of the section 21a.

The first upright section 24, arranged on the section 21a on the centerline thereof and on the forward side relative to the opening 23, forms a coupling section adapted to being mechanically coupled with the seat 91 that is to be attached. For attaching the seat 91, in particular the rear leg thereof, the coupling section 24 is provided with an opening 24a in the manner of a through-hole or eye.

The second and third sections 25a and 25b are of substantially identical shape and are arranged symmetrically on both sides of the centerline of the base part 21, on a backward side relative to the opening 23. The function of the sections 25a, 25b will be explained further below.

Figures 7A, 7B:
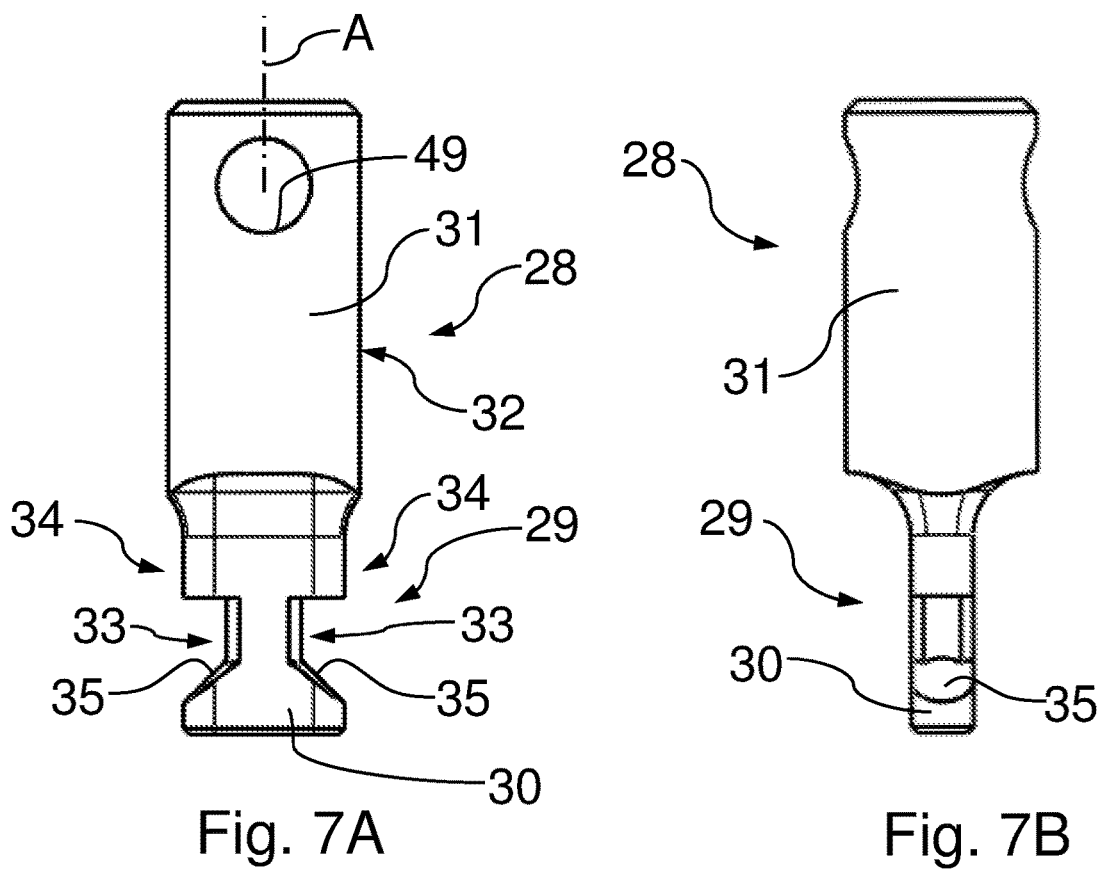
FIG. 7A shows a locking element, in the form of a center pin, of the device according to the embodiment of FIGS. 2 to 5 in a front view.
FIG. 7B shows the locking element of FIG. 7A in a side view.

The device 10 further comprises a locking element 28, which has a pin-type shape and is displayed separately in FIGS. 7A, 7B. The locking element 28 serves as a center pin 28 of the device 10.

The locking element 28 comprises a portion 31, corresponding in FIGS. 7A, 7B to an upper portion of the locking element 28, which has a substantially cylindrical outer shape, defined by the cylindrical lateral surface 32 of the portion 31. The axis of the cylindrical lateral surface 32 also defines a longitudinal axis A of the locking element 28. An outer contour of the section 31 is substantially circular.

Near one end of the locking element 28, the cylindrical portion 31 is provided with a transverse through-hole 49 formed as a cylindrical bore of circular cross-section. The function of the through-hole 49 will be described further below.

A diameter of the portion 31 may, for instance, be chosen such as to approximately correspond to the diameter of the opening 23, with tolerances or play being chosen in such a way that the cylindrical portion 31 can be slidably and rotatably received within the opening 23. In this manner, the locking element 28 can be inserted into the opening 23, in FIGS. 2, 3 and 5 from above the base part 21 for example, and can thereby be coupled to the base part 21.

The locking element 28, the portion 31 of which, in the state of FIGS. 2 to 5 and 11, is partially received in the opening 23 and extends therethrough, is enabled to both axially linearly move along the axis A and rotate about the axis A within the opening 23. When the locking element 28 is inserted into the opening 23, the axis A coincides with a center axis of the opening 23.

The locking element 28 further comprises an end section 29, which in FIGS. 7A, 7B corresponds to a lower portion of the locking element 28. A shape of the end section 29 is flattened with respect to the upper portion 31. FIGS. 7A, 7B shows that the end section 29 is laterally contained within an imaginary extension of the essentially cylindrical lateral surface 32 of the portion 31. For example, it may be expedient to manufacture the locking element 28 by removing material from an initially cylindrical pin, e.g. by milling or other material-removing processes.

FIG. 7A-7B, for example, also show that the end section 29 comprises a tip portion 30, at an end of the locking element 28 opposite the end thereof that comprises the transverse bore 49, wherein the tip portion 30 is shaped in the manner of a dove tail. On opposite narrow sides 34 of the end section 29, recesses 33 are provided symmetrically with respect to the axis A. The recesses 33 may, for instance, be cut into the narrow sides 34 when the locking element 28 is manufactured. Each of the recesses 33 comprises a retaining surface 35 that obliquely extends with respect to the longitudinal axis A of the locking element 28. By forming these recesses 35, the dovetail-type shape of the tip portion 30 is obtained. Each retaining surface 35 may be flat, but preferably may be convex for a more uniform distribution of pre-tensioning and holding forces as will be described below in more detail.

Figure 9A:
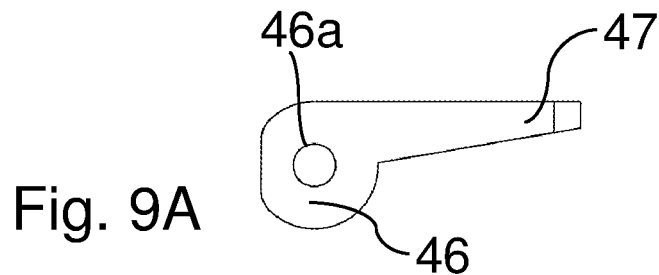
FIG. 9A shows a component of a tensioning arrangement of the device according to the embodiment of FIGS. 2 to 5 in a side view.
Figure 9B:
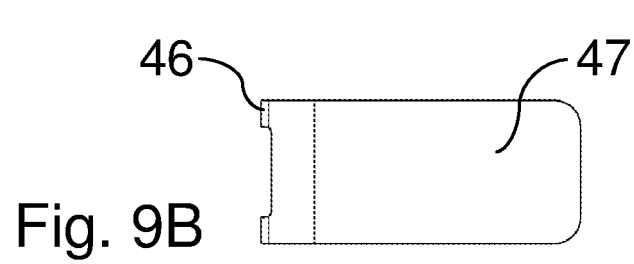
FIG. 9B shows the component of FIG. 9A in a top view.
Figure 9C:
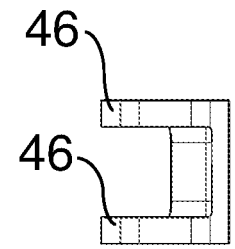
FIG. 9C shows the component of FIG. 9A in an end view.

In an assembled state of the device 10, as shown in FIGS. 2 to 4, a pin 48 passes through the through-hole 49 of the locking element 28. The pin 48 pivotably connects two cams 46 on either side of the section 31 with the locking element 28. The two cams 46 are formed with the same shape and are both integrally formed with a lever 47. Hence, the cams 46 and the lever 47 form portions of a unitary component, which is shown again separately in FIGS. 9A-C.

Each cam 46 is provided with an opening 46a, each receiving an end of the pin 48. The pin 48 may tightly fit either in the through-hole 49 or in the openings 46a.

The attachment rail 15 is provided with a plurality of bushes 55, see in particular FIGS. 3, 5, 6A-E and 11. At each position of one of the through-holes 60 in the upper flange 51 along the longitudinal direction of the rail 15, one of the plurality of bushes 55 is connected to the upper flange 51 from a lower side thereof. Accordingly, each of the through-holes 60 is equipped with one of the bushes 55, before the rail 15 is installed as part of the cabin floor 6.

In the embodiment displayed in the figures, the bushes 55 are all formed in the same way and are each made from a metal material, for example from a titanium alloy or from a steel.

Each bush 55 comprises an outer shape that is substantially rotationally symmetric. More specifically, the outer shape of each bush 55 is that of an essentially cylindrical body, having a circular outer cross-sectional shape, and provided with an outwardly-extending annular collar 55a. The collar 55a circumferentially extends on the outer side of the bush 55, see FIGS. 3, 5, 6A-E and 11. Along a longitudinal central axis of the bush 55 and seen from the outer side thereof, the bush 55 has two sections in axial direction, wherein the boundary between these two sections is defined by the collar 55a.

The upper section 61 of the bush 55, in FIGS. 3 and 6A on a side above the collar 55a, is configured for being introduced into the corresponding one of the through-holes 60 to which the bush 55 is assigned. For each bush 55, the section 61 hence forms an insertion section 61 that is introduced into the corresponding through-hole 60 until the collar 55a abuts on the lower side of the upper flange 51. In this state, preferably, an end face of the insertion section 61 distant from the collar 55a may be essentially flush with the outer surface 16 of the upper flange 51, or may be slightly offset towards the inside of the through-hole 60.

The collar 55a is adapted to support the bush 55 against the rail main body 50 by abutting on the lower side of the upper flange 51. In particular, the collar 55a is adapted for introducing forces into the upper flange 51 which act on the bush 55 perpendicularly to the upper flange 51, in a positive Z direction, i.e. upwards in FIG. 3.

Using the contacting surface portions of the upper flange 51 and the bush 55, in particular inside the through-hole 60 and around the bush 55 on the lower face of the upper flange 51, the bush 55 and the rail main body 50 are firmly connected, for example by welding or by adhesive bonding. Welding may, for example, be accomplished by local melting or softening of a thermoplastic matrix of the rail main body 50.

FIG. 7 shows three bushes 55 connected to the upper flange 51 for illustration. However, it is understood that, as mentioned above, preferably each of the through-holes 60 will be provided with one of the bushes 55. Accordingly, a seat rail 15 of this embodiment will typically be provided with many bushes 55 along its length.

Each bush 55 has an internal, longitudinal passage 56 extending from the upper end to the lower end of the bush 55.

On the upper side of the bush 55, which is turned towards the upper flange 51 when the bush 55 is connected to the rail 15, and in part is inserted into the through-hole 60, a first portion of the passage 56 is formed with a substantially cylindrical cavity 59 at least partly residing inside the through-hole 60 that is associated with the bush 55.

An inner diameter of the substantially cylindrical cavity 59, as a transverse dimension thereof, may substantially correspond to the transverse dimension, or diameter, of the opening 23, or may be slightly larger. An inner cross section of the cavity 59 is substantially circular.

A bottom of the cavity 59 preferably is essentially flat. A portion 57 of the internal passage 56 extends through the bottom of the cavity 59, see FIGS. 6B, 6D, and is formed with an elongated cross-section. The passage portion 57 is centrally arranged at the bottom of the cavity 59, hence the center lines of both the cavity 59 and the passage portion 57 coincide.

Figure 11:
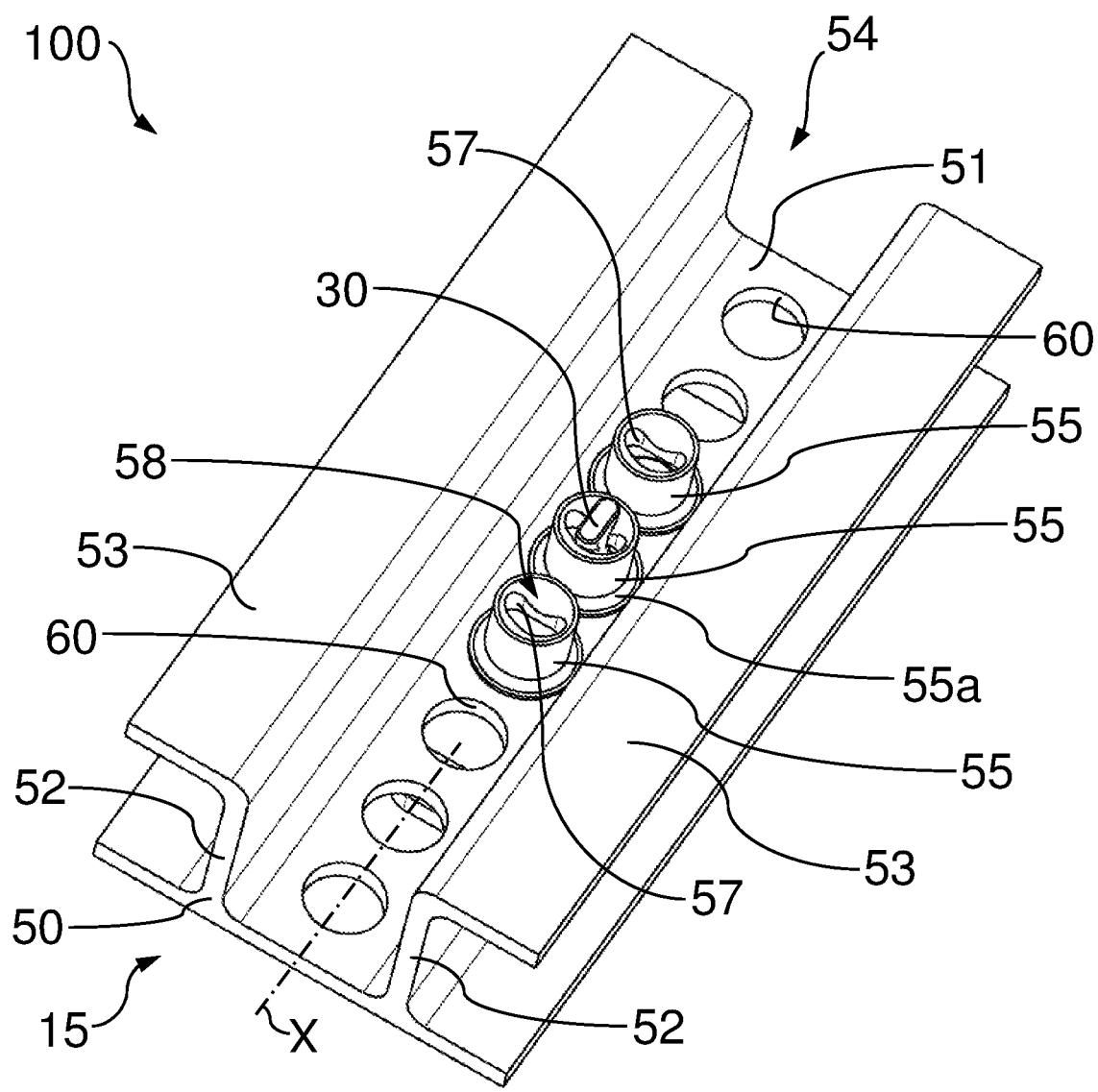
FIG. 11 displays some components of the arrangement according to the embodiment of FIGS. 2 to 5, in a perspective view seen from the underside of the attachment rail.

On the lower side of the bush 55, which faces away from the upper flange 51 of the rail main body 50, the passage portion 57 leads into a relatively shallow cavity or a recess bounded by a contact surface 58, displayed in FIGS. 6E, 11. This shallow cavity or recess forms the last portion of the internal passage 56 of the bush 55 in this embodiment. The passage portion 57 centrally opens within the contact surface 58 into the recess. The contact surface 58 may, for example, be formed as part of a conical or spherical surface.

It should be noted that the height of the bush 55, in particular, in the direction perpendicular to the upper flange 51 may be different from that shown e.g. in FIGS. 3, 6A-E. For instance, in variants, the axial size of the bush 55 and the length of the locking element 28 may be varied to be shorter or longer than shown in the figures.

In order to attach an object such as the passenger seat 91 to the seat rail 15 installed within the aircraft 1 as part of the cabin floor 6, the device 10 is placed onto the attachment rail 15 in such a manner that the support surface 22 is arranged on the upper surface 16 of the rail 15. This is displayed in FIG. 2. The device 10 is arranged in such a way that a center line of the opening 23 coincides with the center line of one of the through-holes 60 and of the bush 55 assigned to that through-hole 60.

The locking element 28 may already be coupled to the base part 21 when the base part 21 is placed onto the rail 15, or the locking element 28 may be inserted, with the tip portion 30 ahead, into and through the opening 23 once the base part 21 rests on the outer surface 16 of the rail 15.

In both these cases, the cylindrical portion 31 is slidably and rotatably received in the opening 23, and after insertion, the locking element 28 partially protrudes from the support surface 22 downward along a line of protrusion 36, see FIG. 3. The line of protrusion 36 corresponds in FIG. 3 to the axis A of the locking element 28. In this manner, when the base part 21 and the locking element 28 are coupled and before the device 10 is firmly attached to the rail 15 as will be described below, the locking element 28 is movable relative to the base part 21 along the line of protrusion 36 and is rotatable in the opening 23 with respect to the base part 21 about the line 36.

The section 61 of each of the bushes 55 resides within one of the through-holes 60. Hence, the passage 56 of each bush 55 can be accessed from the outer surface 16 of the upper flange 51. When placing the device 10 onto the rail 15, or when inserting the locking element 28 after placing the base part 21 onto the rail 15, the locking element 28 is partially inserted, with the tip portion 30 ahead, into the passage 56 which extends through the bush 55, and hence through the upper flange 51 of the attachment rail 15.

Inserting the tip portion 30 of the locking element 28 into the passage 56 is performed with long sides of the tip portion 30 being oriented transversely, in particular perpendicularly, to the longitudinal direction of the rail 15 which coincides with the X-direction in FIG. 2. This corresponds to an unlocked orientation U of the tip portion 30 which is schematically illustrated by a dash-dotted line in FIGS. 2 and 4. Further, when inserting the tip portion 30 into the passage 56, the component including the lever 47 and the cams 46 is in a position, not shown, in which the lever 47 is oriented upright from the plate-shaped section 21, for example approximately parallel to the axis A.

In other words, in order to insert the tip portion 30 into the internal passage 56, compared with the situation shown in FIGS. 2 to 5, the lever 47 is to be pivoted upwards through an angle of, for example, about 90 degrees, and the locking element 28 is to be rotated to orient the long sides of the tip portion 30 transversely as indicated by the dash-dotted line U, for example by rotating the locking element 28 through an angle of about 90 degrees.

Furthermore, when placing the base part 21 onto the upper surface 16 of the attachment rail 15 in such a way that the opening 23 is centered on one of the through-holes 60 and the associated bush 55, the protrusion 78 can be inserted into the cavity 59 of another one of the bushes 55, assigned to another through-hole 60. In the embodiment illustrated in the figures, the protrusion 78 can be inserted into the cavity 59 of the bush 55 at the position of the through-hole 60 adjacent the through-hole 60 on which the opening 23 is centered. However, in variants of the embodiment, the distance between the protrusion 78 and the opening 23 may be different, for example so as to be able to insert the protrusion 78 into the bush 55 after the next one as seen from the opening 23, i.e. leaving one bush 55 unused in between.

The outer diameter of the protrusion 78, which is shaped as a circular cylinder in the embodiment, may be slightly larger than the outer diameter of the section 31 of the locking element 28. In addition to preventing global rotation of the device 10 on the surface 16, i.e. around the Z-direction, the protrusion 78 dimensioned in this manner makes it possible to reliable transmit forces acting along the X-direction from the base part 21 through the protrusion 78 into the rail 15. The protrusion 78 thus forms a so-called passive forward interface point, which does not transmit loads acting perpendicularly to the surface 16 of the upper flange 51 in positive Z direction.

After inserting the locking element 28 into and through the passage 56 in such a way that the tip portion 30 has been fully guided through the passage portion 57 and has exited therefrom in the region of the lower end of the bush 55, the tip portion 30 can be engaged, by virtue of its dovetail-type shape, with the bush 55 by rotation of the locking element 28 about the axis A. More specifically, in order to lock the device 10 to the attachment rail 15, the locking element 28 is rotated about the axis A through, for example, approximately 90 degrees in order to align the long sides of the tip portion 30 with the longitudinal direction of the rail 15. This orientation of the tip portion 30 corresponds to a locked orientation L thereof, which is shown in FIG. 11, for example. FIG. 11 also shows that the passage portion 57 of each bush 55 is oriented in such a way that a longitudinal direction of the portion 57, parallel to the long sides of the passage portion 57, extends transverse to the longitudinal direction of the rail 15, shown parallel to direction X. The device 10 hence can be engaged with and locked to the rail 15 in the manner of a bayonet-type mechanism.

The lever 47, the cams 46 and the pin 48 described above form a tensioning arrangement 45. After engaging the tip portion 30 of the locking element 28 with the bush 55 by rotating the locking element 28, the lever 47 is pivoted by the operator in a direction downward into the position shown in FIGS. 2 and 3. In accordance with the pivoting movement of the lever 47, the cams 46 integrally formed with the lever 47 are rotated about the axis of the pin 48. The cams 46 are supported on the upper surface of the plate-shaped section 21a. By moving the lever 47 downward and rotating the cams 46, the pin 48 and the locking element 28 are pulled upward in positive Z direction. Thereby, the tip portion 30 is pulled against the bush 55, so that the retaining surfaces 35 are pressed on the contact surface 58 and a tensioning load is applied to the locking element 28, in order to pre-tension the device 10, including the base part 21, with respect to the rail 15. The configuration of the pin 48, lever 47 and cams 46, in particular including the position of the pin 48 and the contour of the cams 46, is chosen such that in the state of FIGS. 2 and 3, the tensioning arrangement 45 will remain in the clamped, tensioned state unless the lever 47 is lifted.

By virtue of the dovetail-type shape of the tip portion 30, the tip portion 30 can smoothly rotate within the shallow recess at the lower end of the bush 55 when the locking element 28 is not tensioned. The contact surface 58 is adapted for surface contact with the retaining surfaces 35. Forces acting on the locking element 28 in the positive Z-direction, see FIGS. 1,2 and 3, are transmitted to the bush 55 via the retaining surfaces 35. The surface contact of these with the contact surface 58 avoids local stress concentration and helps to distribute the forces to be transmitted evenly. Also, the dovetail-type shape of the tip portion 30 may help to improve centering the locking element 28, or center pin 28, with respect to the bush 55.

When the device 10 is locked and tensioned onto the rail 15, forces acting in the positive Z direction on the locking element 28 are transmitted at the position of the opening 23 to the upper flange 51, and thus to the rail main body 50, via the collar 55a. Forces acting on the base part 21 in the negative Z direction, such as weight, are supported via the support surface 22. Moreover, the firm connection of the bushes 55 and the rail main body 50, obtained e.g. by welding or adhesive bonding, prevents the bushes 55 from separating from the rail main body 50 due to forces, especially downward forces, acting during installation of the device 10.

The device 10 may preferably be adapted to prevent rotation of the locking element 28 about the axis A when the locking element 28 is tensioned with respect to the attachment rail 15, so as to prevent, for example, inadvertent unlocking of the device 10. The anti-rotation sections 25a and 25b illustrated in FIGS. 2 and 3 may be configured at least for avoiding or preventing the rotation of the lever 47, which is coupled to the locking element 28, about the axis A by providing lateral guidance and a lateral stop. Additional means for preventing rotation of the lever 47 about the axis of the pin 48 may be included if desired, for preventing inadvertent unlocking and/or for preventing abuse. For example, a cover or a latch or detent mechanism which can only be released using a special tool, may be provided for this purpose.

In the embodiment described above, the locking element 28, the body of the base part 21 including the sections 21a, 24, 25a-b and the protrusion 78, the component integrally comprising the cams 46 and the lever 47, as well as the pin 48, are each made from a metal material, which in particular may be an aluminum alloy or a titanium alloy or a steel. The same or different of these materials may be used for the components 28, 21, 46 and 47, as well as 48, of the device 10.

By virtue of the bushes 55 and the locking element 28 being formed from one or more metal material(s), e.g.

titanium or steel, these components may be formed to be resistant to wear and corrosion, at limited cost. The main body 50 of the rail 15 may be made from fiber-reinforced synthetic material such as carbon-fiber-reinforced thermoplastic, is hence lightweight and contributes to avoiding corrosion. Damages to the rail main body 50 during installation and locking of the device 10, and exceedingly high loading of the surface of such composite material, can be prevented using the bushes 55 and locking element 28 made from metal. The device 10 in this way also helps to avoid deteriorating edges, for example at the through-holes 60, when the device 10 is repeatedly installed and removed. When the device 10 is installed and under load, the bushes 55 ensure a smoother and more distributed load application from the center pin 28 to the seat rail 15.

Additionally, the omega-shape of the rail main body 50, combined with the introduction of loads via the bushes 55 arranged at the positions of the through-holes 60 in the upper flange 51 along the centerline thereof, does not only avoid damage to a composite rail main body 50 by preventing excessive local concentration of contact forces, but also provides a stable flange 51 resistant to deformation or unfolding by virtue of its geometry and symmetric loading, whereby damage to the matrix is prevented.

In a further variant of the above-described device 10, the base part 21 may be provided with a section 21a having more than one opening 23, for example two openings 23, more than one locking element 28, for example two locking elements 28, and more than one tensioning arrangement 45, for example two arrangements 45. In this variant, the openings 23 are arranged along the longitudinal direction of the section 21a, such that each of the two locking elements 28, which are each received in one of the openings 23, may be inserted into passages 56 associated with two through-holes 60. Further, in such a variant, the levers 47 and cams 46 of each tensioning arrangement 45 may be operable independently of the other arrangement 45, whereby the locking elements 28 may be tensioned independently of each other. For example, the free ends of each lever 47 may point toward each other when the device 10 is engaged and locked. In this way, higher loads may be supported by the device 10 and transmitted to the rail 15.

It should be noted that in further variants of the above-explained embodiments, an intermediate protective layer, not shown in the Figures, may be arranged between the plate-shaped section 21a and the outer surface 16 of the upper flange 51. For example, such a protective layer, e.g. made from sheet metal or from a sheet of synthetic material, may be arranged on the entire surface 16, or preferably may be arranged on the bottom face of the plate-shaped section 21a in such a manner that the protective layer becomes part of the base part 21, wherein in the latter case, the support surface 22 is then formed on the intermediate layer. Further, in the latter case, the intermediate protective layer may preferably be formed as a layer of synthetic material on the bottom face of the plate-shaped section 21. In this way, corrosion may be prevented in a further improved manner with the aid of the intermediate layer.

In the above, attaching a passenger seat 91 to the attachment rail 15 using the device 10 has been described in detail. However, the disclosure herein may be used to attach other objects to the attachment rail 15. In some examples, the device 10 may be formed as a fitting for attaching a monument (not shown in the figures) within the cabin. The monument attached may, for example, be a galley monument or a lavatory monument or a storage monument or an object of another type that is to be attached to the attachment rail 15. In particular, the coupling section 24 may be varied or adapted if and as appropriate for attaching objects 91 that are different from seats.

Furthermore, while producing the rail main body 50 of the seat attachment rail 15 from a fiber-reinforced synthetic material, in particular a thermoplastic reinforced by carbon fibers, is particularly preferred, the rail main body 50 may be formed from a metal material in alternative embodiments, for example using a folded metallic sheet technology.

Although the disclosure herein has been completely described above with reference to preferred embodiments, the disclosure herein is not limited to these embodiments but may be modified in many ways.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 aircraft
3 fuselage
6 cabin floor
10 device
15 attachment rail
16 outer surface
21 base part
21a plate-shaped section
22 support surface
23 opening
24 coupling section
24a opening
25a anti-rotation section
25b anti-rotation section
28 locking element
29 end section
30 tip portion
31 cylindrical portion
32 lateral surface
33 recess
34 narrow side
35 retaining surface
36 line of protrusion
45 tensioning arrangement
46 cam
46a opening
47 lever
51 upper flange
52 web
53 lower flange
54 channel
55 bush
55a collar
56 internal passage (bush)
57 passage portion 58 contact surface
59 cavity
60 through-hole
61 section (bush)
78 protrusion
79 lateral outer surface (protrusion)
91 object
100 arrangement
A longitudinal axis (locking element)
L locked orientation (locking element)
U unlocked orientation (locking element)
X X-direction
Y Y-direction
Z Z-direction

The invention claimed is:

1. A device for attaching an object to an attachment rail or a seat rail in an aircraft or spacecraft, the device comprising:
    a base part comprising a support surface configured to be placed onto an outer surface of the attachment rail;
    at least one locking element comprising a portion having a substantially cylindrical outer shape, wherein:
        the at least one locking element is configured to be received in and extend through an opening in the base part;
        the at least one locking element is configured to partially protrude from the support surface of the base part along a line of protrusion;
        wherein an end section of the at least one locking element has a tip portion shaped in a dovetail-type manner;
        wherein the end section of the at least one locking element is formed with a shape that is flattened with respect to the portion having the substantially cylindrical outer shape; and
        wherein the end section of the at least one locking element is entirely laterally contained within an imaginary extension, in a direction of a longitudinal axis of the at least one locking element, of the substantially cylindrical outer shape; and
    at least one tensioning arrangement;
    wherein the base part and the at least one locking element are, or are configured to be, coupled such that the at least one locking element is movable relative to the base part along the line of protrusion and is rotatable with respect to the base part; and
    wherein the at least one tensioning arrangement is configured, when the support surface of the base part rests on the outer surface of the attachment rail and when the tip portion is in an engaging position relative to the attachment rail, for tensioning the at least one locking element with respect to the attachment rail.

2. The device according to claim 1, wherein the at least one locking element has a substantially pin-type shape.

3. The device according to claim 1, wherein the at least one locking element is configured to be partially inserted, with the tip portion of the at least one locking element ahead, into a passage extending into the attachment rail from the outer surface thereof.

4. The device according to claim 1, wherein:
    the end section of the at least one locking element comprises recesses that are formed on opposite lateral sides of a narrow portion of the end section;
    the narrow portion has a thickness, in a direction transverse to the longitudinal axis of the at least one locking element, that is less than a diameter of the portion having the substantially cylindrical outer shape;
    each of the recesses defines, on opposite lateral sides of the tip portion, a retaining surface that obliquely extends with respect to the longitudinal axis of the at least one locking element.

5. The device according to claim 1, wherein the tensioning arrangement comprises:
    at least one cam that is pivotably coupled with the at least one locking element; and/or
    a lever for applying a tensioning load on the at least one locking element.

6. The device according to claim 3, wherein the base part is additionally formed with a protrusion on the support surface at a position spaced from a position of the at least one locking element, the protrusion being integrally formed with the base part or being formed by an additional element fixedly connected thereto, wherein the protrusion is configured to be inserted into a further passage extending from the outer surface into the attachment rail.

7. The device according to claim 1, wherein:
    the device is formed as a fitting or a rear fitting, for attaching a passenger seat of an aircraft or spacecraft to the attachment rail; or
    the device is formed as a fitting for attaching a monument to the attachment rail within a cabin of an aircraft or spacecraft.

8. An arrangement for attaching an object within an aircraft or spacecraft, the arrangement comprising:
    at least one attachment rail comprising:
        a rail main body that has an upper flange comprising a plurality of through-holes arranged along the upper flange according to a predetermined pattern; and
        a plurality of bushes that are connected to the upper flange from a lower side of the upper flange, wherein each bush of the plurality of bushes is:
            arranged at a position corresponding to a position of an associated one of the plurality of through-holes; and
            formed with an internal passage therethrough;
    at least one device for attaching the object to the at least one attachment rail, the at least one device comprising:
        a base part comprising a support surface configured to be placed onto an outer surface of the at least one attachment rail;
        at least one locking element configured to partially protrude from the support surface of the base part along a line of protrusion; and
        at least one tensioning arrangement;
        wherein the base part and the at least one locking element are, or are configured to be, coupled such that the at least one locking element is movable relative to the base part along the line of protrusion and is rotatable with respect to the base part;
        wherein an end section of the locking element has a tip portion shaped in a dovetail-type manner; and
        wherein the at least one tensioning arrangement is configured, when the support surface of the base part rests on the outer surface of the at least one attachment rail and when the tip portion is in an engaging position relative to the at least one attachment rail, for tensioning the at least one locking element with respect to the at least one attachment rail;
    wherein the at least one locking element of the at least one device extends into the internal passage of one of the bushes, with the tip portion being engageable with the bush.

9. The arrangement according to claim 8, wherein the internal passage of each bush of the plurality of bushes comprises a passage portion formed with an elongated cross-section.

10. The arrangement according to claim 9, wherein each bush of the plurality of bushes comprises, on a side of the bush facing away from the upper flange of the rail main body, a contact surface adjacent the passage portion formed with the elongated cross-section, the contact surface of the bush being configured to contact retaining surfaces of the tip portion of the at least one locking element, wherein the contact surface of the bush is shaped to create a recess on the side of the bush facing away from the upper flange.

11. The arrangement according to claim 8, wherein the rail main body comprises a cross-section substantially formed with an omega shape.

12. A method for attaching an object within an aircraft or spacecraft, the method comprising:
   providing at least one attachment rail comprising:
      a rail main body that has an upper flange comprising a plurality of through-holes arranged along the upper flange according to a predetermined pattern; and
      a plurality of bushes that are connected to the upper flange from a lower side thereof, each bush being arranged at a position corresponding to a position of an associated one of the through-holes, wherein each of the bushes is formed with an internal passage therethrough;
   providing at least one device comprising:
      a base part comprising a support surface configured to be placed onto an outer surface of the at least one attachment rail;
      at least one locking element configured to partially protrude from the support surface of the base part along a line of protrusion; and
      at least one tensioning arrangement;
      wherein the base part and the at least one locking element are, or are configured to be, coupled such that the at least one locking element is movable relative to the base part along the line of protrusion and is rotatable with respect to the base part;
      wherein an end section of the locking element has a tip portion shaped in a dovetail-type manner; and
      wherein the at least one tensioning arrangement is configured, when the support surface of the base part rests on the outer surface of the at least one attachment rail and when the tip portion is in an engaging position relative to the at least one attachment rail, for tensioning the at least one locking element with respect to the at least one attachment rail;
   inserting the at least one locking element of the at least one device into the internal passage of a corresponding bush of the plurality of bushes; and
   engaging the tip portion of the at least one locking element with the corresponding bush.

13. An arrangement for attaching an object within an aircraft or spacecraft, the arrangement comprising:
   at least one device according to claim 1; and
   at least one attachment rail comprising:
      a rail main body that has an upper flange comprising a plurality of through-holes arranged along the upper flange according to a predetermined pattern; and
      a plurality of bushes that are connected to the upper flange from a lower side of the upper flange, wherein each bush of the plurality of bushes is:
         arranged at a position corresponding to a position of an associated one of the plurality of through-holes; and
         formed with an internal passage therethrough;
      wherein the at least one locking element of the at least one device extends into the internal passage of one of the bushes, with the tip portion being engageable with the bush.

14. A method for attaching an object within an aircraft or spacecraft, the method comprising:
   providing at least one device according to claim 1;
   providing at least one attachment rail comprising:
      a rail main body that has an upper flange comprising a plurality of through-holes arranged along the upper flange according to a predetermined pattern; and
      a plurality of bushes that are connected to the upper flange from a lower side thereof, each bush being arranged at a position corresponding to a position of an associated one of the through-holes, wherein each of the bushes is formed with an internal passage therethrough;
   inserting the at least one locking element of the at least one device into the internal passage of a corresponding bush of the plurality of bushes; and
   engaging the tip portion of the at least one locking element with the corresponding bush.

\* \* \* \* \*